(12) United States Patent
VanderZee et al.

(10) Patent No.: US 10,165,436 B2
(45) Date of Patent: *Dec. 25, 2018

(54) DEVICE AND METHOD FOR SETTING NETWORK AND CHANNEL INFORMATION IN A NETWORK DEVICE

(71) Applicant: TRANE INTERNATIONAL INC., Davidson, NC (US)

(72) Inventors: Joel C. VanderZee, La Crosse, WI (US); John Sinz, Seaside, OR (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,290

(22) Filed: Dec. 21, 2017

(65) Prior Publication Data
US 2018/0115883 A1     Apr. 26, 2018

Related U.S. Application Data

(63) Continuation of application No. 15/490,443, filed on Apr. 18, 2017, now Pat. No. 9,860,733, which is a
(Continued)

(51) Int. Cl.
| | | |
|---|---|---|
| *H04W 8/26* | (2009.01) | |
| *H04W 8/00* | (2009.01) | |
| *H04L 12/24* | (2006.01) | |
| *H04W 48/12* | (2009.01) | |
| *H04L 29/12* | (2006.01) | |
| *H04W 48/08* | (2009.01) | |

(Continued)

(52) U.S. Cl.
CPC ......... *H04W 8/005* (2013.01); *H04L 41/0803* (2013.01); *H04L 41/0806* (2013.01); *H04L 61/2038* (2013.01); *H04W 48/08* (2013.01); *H04W 48/12* (2013.01); *H04W 52/0212* (2013.01); *H04L 61/6004* (2013.01); *H04L 61/6081* (2013.01); *H04W 84/18* (2013.01); *Y02D 70/144* (2018.01); *Y02D 70/162* (2018.01); *Y02D 70/22* (2018.01)

(58) Field of Classification Search
CPC . H04L 61/6081; H04L 61/6004; H04W 84/18
See application file for complete search history.

(56) References Cited

U.S. PATENT DOCUMENTS

| | | |
|---|---|---|
| 6,865,596 B1 | 3/2005 | Barber et al. |
| 7,295,960 B2 | 11/2007 | Rappaport et al. |

(Continued)

OTHER PUBLICATIONS

Ad-Hoc Association of Pre-determined ZigBee Devices.
(Continued)

*Primary Examiner* — Jay P Patel
(74) *Attorney, Agent, or Firm* — Hamre, Schumann, Mueller & Larson, P.C.

(57) ABSTRACT

Devices and methods use an Extended Permanent Account Number Identification (EPID) of a mesh network (e.g., ZigBee) to include in the EPID a network information, a network channel information (e.g., 802.15.4 channel), and/or other data. The devices and methods allows a node to use the EPID to identify a desired network to join and join the network on the predetermined channel for that network.

5 Claims, 1 Drawing Sheet

Related U.S. Application Data continuation of application No. 14/216,364, filed on Mar. 17, 2014, now Pat. No. 9,635,602.

(60) Provisional application No. 61/790,663, filed on Mar. 15, 2013.

(51) Int. Cl.
*H04W 52/02* (2009.01)
*H04W 84/18* (2009.01)

(56) References Cited

U.S. PATENT DOCUMENTS

| | | | |
|---|---|---|---|
| 7,936,709 B2 | 5/2011 | Bhatti et al. | |
| 8,072,962 B2* | 12/2011 | Lee | H04L 29/12264 |
| | | | 370/328 |
| 8,179,815 B2 | 5/2012 | Rudland et al. | |
| 8,437,276 B2 | 5/2013 | Dinur | |
| 8,445,826 B2 | 5/2013 | Verfuerth | |
| 8,878,451 B2 | 11/2014 | Lee et al. | |
| 2008/0175210 A1 | 7/2008 | Jamieson | |
| 2011/0149803 A1* | 6/2011 | McCormack | H04W 8/005 |
| | | | 370/254 |
| 2011/0269397 A1* | 11/2011 | Bella | H04B 7/15507 |
| | | | 455/11.1 |
| 2011/0314163 A1* | 12/2011 | Borins | H04W 4/005 |
| | | | 709/227 |
| 2012/0082062 A1* | 4/2012 | Mccormack | H04W 48/14 |
| | | | 370/254 |
| 2012/0083934 A1 | 4/2012 | Jesudason et al. | |
| 2012/0299509 A1* | 11/2012 | Lee | H04L 41/0806 |
| | | | 315/291 |
| 2013/0028184 A1 | 1/2013 | Lee et al. | |
| 2013/0142059 A1 | 6/2013 | Di Girolamo et al. | |
| 2013/0279540 A1 | 10/2013 | Hui et al. | |
| 2013/0285558 A1 | 10/2013 | Recker et al. | |
| 2013/0306276 A1 | 11/2013 | Duchesneau | |
| 2013/0322281 A1 | 12/2013 | Ludlow et al. | |
| 2014/0301192 A1* | 10/2014 | Lee | H04L 47/10 |
| | | | 370/230 |
| 2015/0312089 A1* | 10/2015 | Yang | H04L 41/0886 |
| | | | 370/217 |

OTHER PUBLICATIONS

ZigBee White Paper.
What is an Extended PAN ID and how is it used?
Zigbee and Wireless Radio Frequency Coexistence; Overview on802.15.4—Zigbee.
Page 147 of Book titled Zigbee Wireless Networking by Drew Gislason.

\* cited by examiner

DEVICE AND METHOD FOR SETTING NETWORK AND CHANNEL INFORMATION IN A NETWORK DEVICE

FIELD

This disclosure generally relates to devices and methods for setting a network information and a network channel information within an Extended Permanent Account Number Identification (Extended PAN ID or EPID) of a mesh network (e.g., ZigBee) allowing a node to identify a desired network to join and join the network on the correct channel.

BACKGROUND

Generally, a node in a ZigBee network sends a beacon packet that includes the EPID. The EPID of the ZigBee network is a 64-bit value that can uniquely identify a particular network. An Organizationally Unique Identifier (OUI) is a 24-bit number which uniquely identifies a vendor, manufacturer, or other organization and reserves a block of derivative identifiers.

SUMMARY

The embodiments disclosed herein are directed towards a device and method for setting a network information, a network channel information (e.g., 802.15.4 channel), and/or other data within an EPID of a mesh network, allowing a node to identify a desired network to join and join the network on the predetermined channel for that network. The node can store the EPID in a non-transitory memory.

BRIEF DESCRIPTION OF THE DRAWINGS

Referring now to drawings, in which like reference numbers represent corresponding or similar parts.

DETAILED DESCRIPTION

This disclosure is directed towards a device and method for setting a network information, a network channel information (e.g., 802.15.4 channel), and/or other data within an EPID of a mesh network (e.g., ZigBee). The method allows a node to identify a desired network to join and/or join the network on a predetermined channel for that network.

A mesh network is a type of networking, usually wirelessly, of two or more nodes, where each node receives and transmits data, and also serves as a relay for other nodes. In the mesh network, the nodes collaborate to propagate the data in the network. ZigBee is an example of the mesh network. ZigBee is a specification for communication protocols using small, low-power digital radio devices based on an IEEE 802 standard for personal area networks (PAN). An example of the low-power digital radio devices includes a Wireless Communication Interface (WCI).

The EPID includes a unique identifier of a network. A device creating a ZigBee network can specify the EPID for the network. OUI can be in the first 24 bits of the EPID so that devices of different organizations can form unique networks with distinct EPIDs. The OUI can be the first 24 bits of the ZigBee MAC address, which is unique among IEEE 801.15.4 devices, so an organization can decide to set the EPID of a network to the MAC address of the device creating the network.

The EPID is included in the beacon packet sent by devices in a network in response to a beacon request. The method disclosed herein uses the beacon packet to transmit and/or receive extra information about the network from the EPID. The EPID can have multiple types of information, such as, a channel (frequency band) of the network the device should use. A conventional method merely assumes that the network channel is the frequency of the beacon and/or beacon response that the device has detected. Thus, the conventional method can lead to the devices in the same network using different (or multiple) channels due to various errors.

The EPID can include a network identification that can be preset on the device (e.g., using rotary dials) so that the device can instantly join the network as soon as it is powered up. The embodiment allows for setting network devices to join multiple networks forming at the same time.

References are made to the accompanying drawings that form a part hereof, and in which is shown by way of illustration of the embodiments in which the methods and devices described herein may be practiced.

Figure 1:
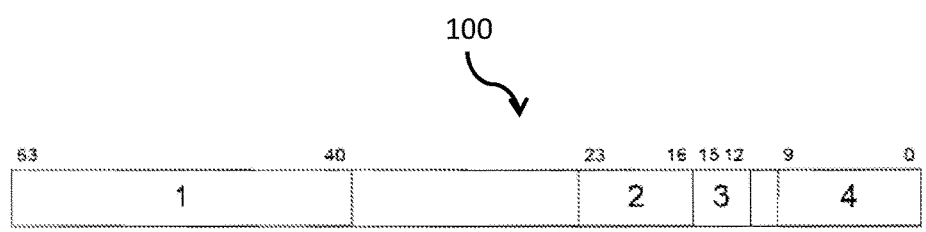
FIG. 1 illustrates an embodiment of an EPID that can be stored in a non-transitory memory.

FIG. 1 illustrates an embodiment of an EPID 100 that can be stored in a non-transitory memory. The EPID 100 can be a 64-bit value format (e.g., bit 0-63) that can be stored in the non-transitory memory. The first section (section 1, e.g., bit 40-63) of the EPID 100 can be set to the OUI so that the EPID 100 will be unique from other EPIDs from other organizations. Only networks with an expected OUI in the section 1 are recognized as containing extra information (e.g., network information, channel, etc.) in other sections of the EPID 100. Sections of the EPID 100 that are not identified in FIG. 1 (e.g., bit 10-11 and/or 24-39) can be used similarly to distinguish among sub-organizations or product families within one OUI. Further, the sections of the EPID 100 that are not identified in FIG. 1 (e.g., bit 10-11 and/or 24-39) can include presence information and/or other data.

Examples of the other data in the EPID 100 include regional information (e.g., regions such as Europe, North America, China, Japan, etc.). The regional information can include regional power limitations for the device. Examples of the other data in the EPID 100 include regional information and data associated with the regional information (e.g., regional power limitations limiting the maximum power that may be used in 2.4 GHz ISM band, etc.). Such regional information (along with associated data) may be used for setting up a network in a particular region(s) so that the devices can automatically determine the appropriate power settings based on the region announced via the EPID 100. For example, bit 11 of the EPID 100 can be used to set a region information (e.g., 0 being North America and 1 being Europe, or vice versa). Accordingly, if the bit is set (e.g., set to 1), the devices having the EPID 100 can join a network and can set its transmission power according to the region designated by bit 11 (e.g., set power limit to European standard, such as for example, channels 11-26 being used up to 10 milliwatts). If the bit is not set (e.g., set to 0), then the device having the EPID 100 does not alter its power limit from its standard default setting (e.g., North America standard, for example, set by the Federal Communications Commission (FCC), such as for example, channels 11-23 being used up to 100 milliwatts and/or higher channels using 1 milliwatts). Alternatively, the bit being set to 0 can be a different region from North America.

Other examples of the other data in the EPID 100 include power-limit information for the device (e.g., maximum power that may be used in 2.4 GHz ISM band, etc.) without the region identifying information.

The second section (section 2, e.g., bit 16-23) of EPID 100 can store a number common to the devices that are intended to operate in the network. The number can be set in various ways, such as through a display on a device, by a tool communicating to the device, or by switches on a device. For example, two decimal rotary switches on the device can set a number in the range 0 to 99, which can be stored directly in the space of section 2. To join a particular network, the device can request beacons on each allowed channel until the device receives a beacon that permits association therewith. That is, the beacon contains a network number in the second section 2 (bit 16-23) that matches (i.e., is same as) the network number in the beacon requesting device.

Section 3 (e.g., bit 12-15) of EPID 100 can store the channel information of the network. The network remains on this channel until the network is disbanded. The network can be recreated using the same channel or another channel. When the network is recreated, the channel can be advertised in the EPID 100. For a ZigBee device that uses sixteen channels in the 2.4 GHz band, the four bits in section 3 are sufficient to store numbers 0 through 15 corresponding to the channel numbers 11 through 26. Accordingly, a device joining a network that includes the channel number in the EPID 100 can reliably determine the correct channel even if there is cross-talk between channels.

Section 4 (e.g., bit 0-9) of EPID 100 can store, for example, a value that identifies a device that created the network (the first device having the network information and the channel information). Even if this section 4 is not used for other devices that automatically joined the network, this information can be useful for displaying to a person or diagnostic tool that can use the value to locate or establish another communication method with the device that created the network.

Figure 2:
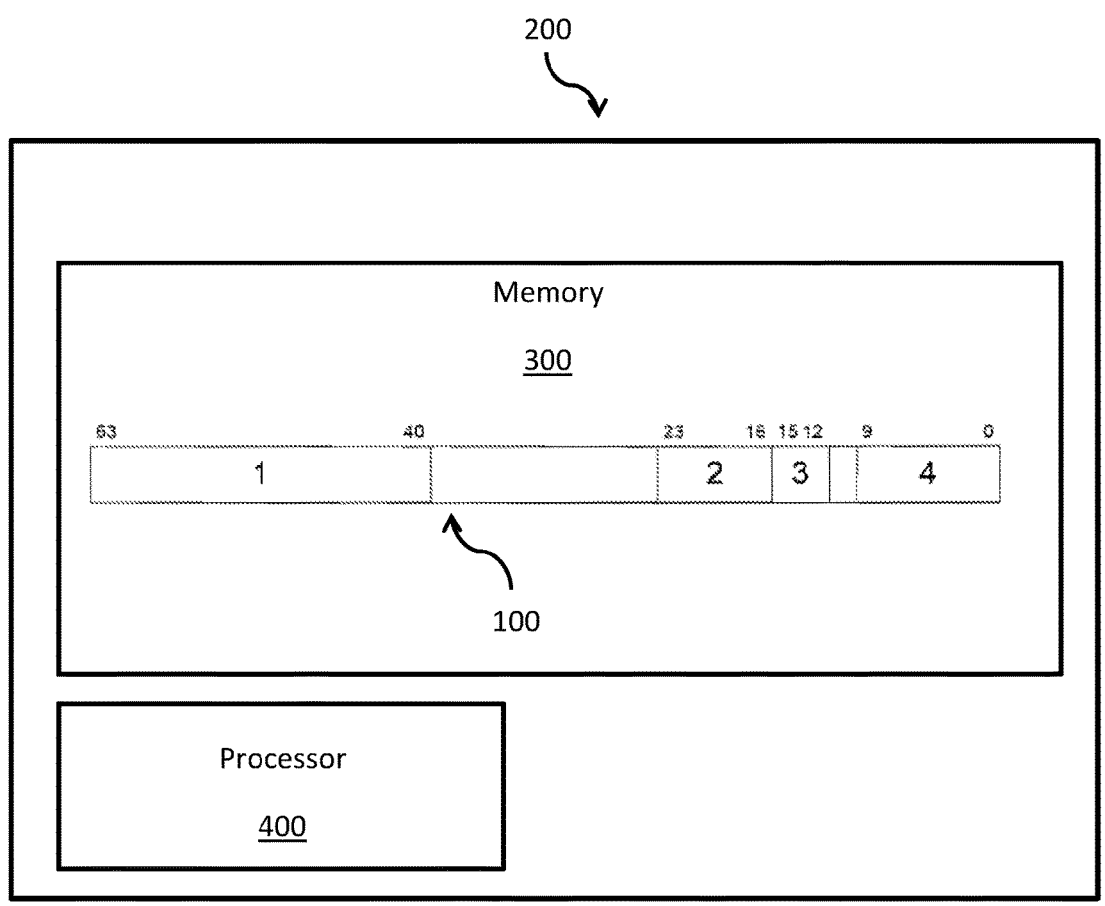
FIG. 2 illustrates an embodiment of a network device having an EPID that is stored as a computer readable format in a non-transitory memory of the network device.

FIG. 2 illustrates an embodiment of a network device 200 having a non-transitory memory 300 which stores an EPID 100 in a computer readable format. The EPID 100 is a 64-bit value format that is stored in the non-transitory memory 300 for being read by a processor 400 to transmit information from the network device 200 (e.g., WCI) to another device (e.g., WCI) in a network (e.g., ZigBee). The EPID 100 shown in FIG. 2 can have the same format as the EPID 100 shown in FIG. 1 and described above.

Some of the advantages of the embodiments disclosed herein are as follows. One common methodology for connecting to a network is a network which permits a device to connect to it when the device looks for a network to join. In contrast, the embodiments using the EPID 100 disclosed herein can allow multiple networks to be constructed at once by devices using the embodiments. Thus, the devices can join their appropriate network without needing to try to join just any open (or available, detected, etc.) network.

Another common methodology for connecting to a network is by pairing of devices by interacting (e.g., powering up) of two or more devices within a certain amount of time. That is, if the user does not interact with the devices within the certain amount of time, the devices cannot form the network. In contrast, the embodiments using the EPID 100 disclosed herein do not require timely user interaction with devices. A network can be formed first or form upon powering up of the device(s). That is, the device(s) can join the network when the network becomes available, even if the device(s) have been powered on for a long time.

Another common methodology for connecting to a network involves using different networks wherein some of the networks are specially configured for commissioning. A new device must first join the commissioning network and then some tool communicates to the device and switches the device (e.g., configures the device) and joins the device to the appropriate network. In contrast, the embodiments using the EPID 100 disclosed herein do not require a special commissioning network.

With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. A method for storing information to an Extended Permanent Account Number Identification (EPID) data for a network device, the method comprising:
   prior to operation of the network device, presetting an identifier information for the network device by using a hardware component that is connected to a computer readable memory of the network device; and
   storing to the computer readable memory the EPID data, wherein the EPID data includes the identifier information,
   the identifier information includes one or more of a unique network identifier of a network for the network device to join, a channel identifier of a network for the network device to join, and a unique device information for the network device.

2. The method according to claim 1, wherein the hardware component includes a switch.

3. The method according to claim 1, wherein prior to operation of the network device, the computer readable memory is not powered up.

4. The method according to claim 1, wherein the identifier information includes the unique device information.

5. The method according to claim 4, wherein the unique device information includes a power-limit information for operation of the network device.

* * * * *